J. T. SANDERS.
SULKY PLOW.
APPLICATION FILED SEPT. 5, 1916.
1,224,025.
Patented Apr. 24, 1917.
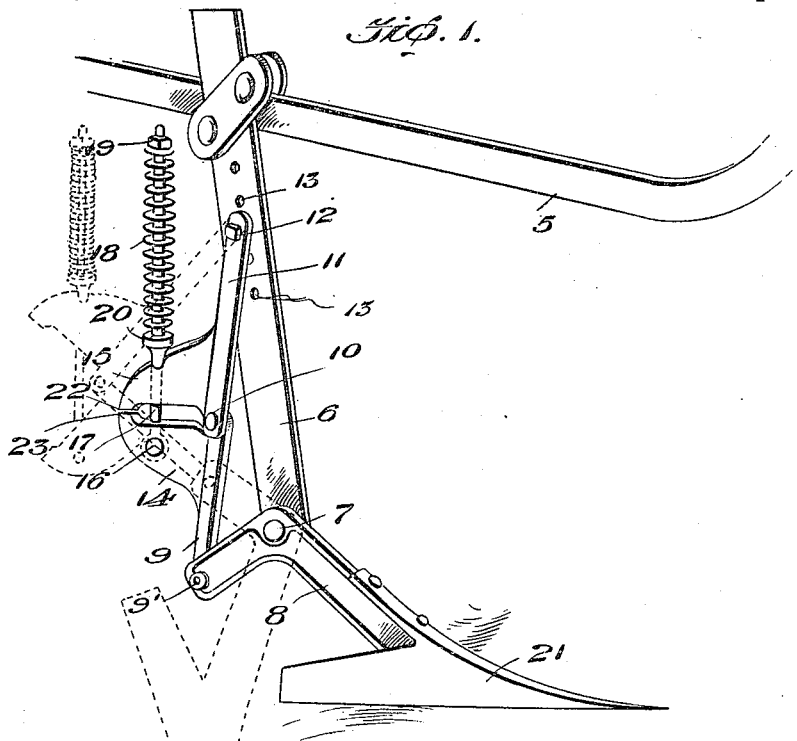
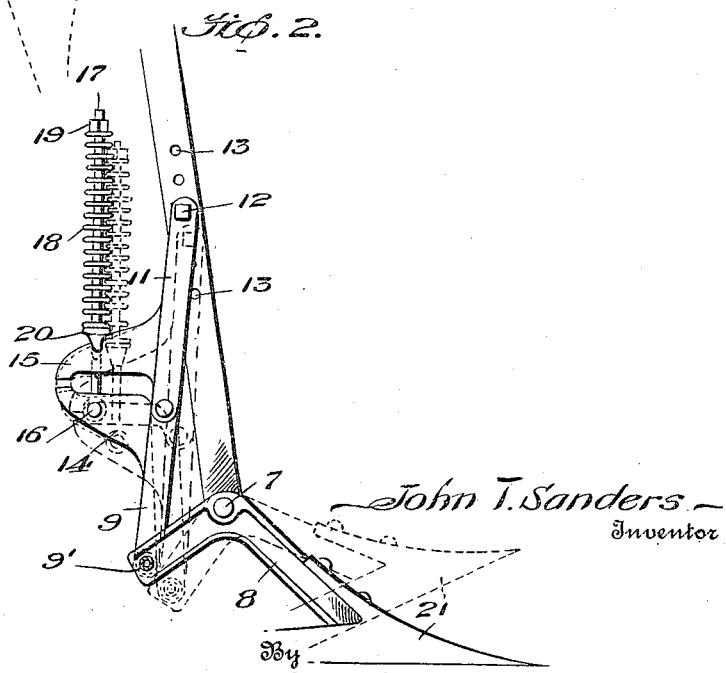
John T. Sanders,
Inventor
Witnesses
By
John Louis Waters, Attorney

UNITED STATES PATENT OFFICE.

JOHN T. SANDERS, OF ROSSER, TEXAS.

SULKY-PLOW.

1,224,025.                Specification of Letters Patent.        Patented Apr. 24, 1917.

Application filed September 5, 1916.   Serial No. 118,520.

*To all whom it may concern:*

Be it known that I, JOHN T. SANDERS, a citizen of the United States, residing at Rosser, in the county of Kaufman and State of Texas, have invented certain useful Improvements in Sulky-Plows, of which the following is a specification, reference being had therein to the accompanying drawing.

This invention relates to improvements in sulky plows, one object of the invention being the provision of a novel supporting means for the earth engaging member of the plow, and by means of which any undue obstructions may be overcome without injuring the same.

A further object of this invention is the provision of a novel spring trip device for the plow foot.

A still further object of this invention is the provision of a plow which is provided with a novel and economical device for adjusting the foot or plow carrying members, and one which is easily and quickly changed and adjusted at the will of the operator.

In the accompanying drawings:—

Figure 1 is a perspective of the rear portion of a sulky plow, with the present invention applied, showing by full lines one position, and by dotted lines another position when tripped.

Fig. 2 is a side elevation of the present device, showing it in untripped position, dotted lines illustrating the position the parts assume when changed to a different working position.

Referring to the drawings, the numeral 5 designates the supporting bar of the sulky which carries the standards 6 having pivotally connected as at 7, the plow carrying foot or member 8.

This member is made in the form of an L and has the short terminal thereof pivotally connected to the link 9, which in turn is pivotally connected as at 10 to the link 11.

This link is detachably connected to the standard 6, by means of the bolt 12, which is adapted to engage any one of the openings 13 to adjust the plow foot or carrying member, as shown by full lines in Fig. 2, and also by dotted lines therein.

Connected to the link 9 is a cam lug 14, while connected to the link 11 is an oppositely disposed cam lug 15. Pivotally connected as at 16 to the cam lug 14, is a rod 17 which has mounted thereon a coil spring 18, adjusted by the nut 19 mounted on the upper end of the rod to vary the tension of the spring upon the member 20, the latter being slidably mounted upon the rod 17 and normally engaging the cam lug 15.

From the foregoing description, it is evident that with the present device, the pitch or working position of the plow 21 may be changed at will, due to the relative positions that member 8 may be caused to assume, the movement of the link 11 downwardly to be held by the bolt 12 in one of the lower openings 13, causing the plow point 21 to assume the dotted line position as shown in Fig. 2.

When the link 11 is elevated so that the bolt 12 is in engagement with any of the other openings 13, the point 21 will be moved from the dotted line position toward the full line position, such full line position as here illustrated being the intermediate one.

By this means, the working position of the member 21 may be changed by merely removing the bolt 12 and attaching it to any one of the selected openings 13.

When the plow 21 engages an obstruction that offers sufficient resistance to bend the same or move the same backwardly, the short arm of the member 8 causes the flexing of the links 9 and 11 and the separation of the lugs 14 and 15, so that tension is placed on the spring 18, as shown by dotted lines on Fig. 1, the release of the plow 21 from the obstruction permitting the spring 18 to return the parts to the position as shown by full lines in Figs. 1 and 2. In this way, the spring 18 acts as a cushion to prevent the breakage of any of the parts and at the same time serves to normally hold the lugs in yielding abutting relation with each other and the links extended.

In connecting the link 9 to the short arm of the member 8, a piped bushing is employed, the same forming a journal at this connection so that a better connection can be made between these parts, when a rivet 9' is passed through the bushing thus providing an effective and pivotal connection at this point.

It is clearly evident from the foregoing description that by the adjustment of the links of the bolt 12 and openings 13, the various working positions of the plow 21 may be secured, and that the same will be maintained in such adjusted position resiliently by means of the spring 18 and the lugs 14 and 15.

What I claim as new is:—

1. The combination with a supporting standard, of a plow supporting and trip device, including a plow carrying member pivotally connected in the lower end thereof, two links pivotally connected together and having their respective free terminals engaging the plow supporting member and said standard, two cam lugs, one of which is carried by each of said links, a rod connected to each of the cam lugs and permitting of relative movement of the lugs, a spring mounted upon said rod, and means acted upon by the spring engaging one of the cam lugs to normally hold the lugs in yielding abutting relation with each other and the links extended.

2. The combination with a supporting standard, of a plow supporting and trip device, including a plow carrying member pivotally connected in the lower end thereof, two links pivotally connected together and having their respective free terminals engaging the plow supporting member and said standard, two cam lugs one of which is carried by each of said links, a rod pivotally connected to the lower of the cam lugs and slidably mounted through the upper cam lug, a spring mounted upon said rod, means acted upon by the spring and engaging the upper cam lug to normally hold the links extended, and coöperative means carried by the cam lugs for limiting the movement of the lugs toward each other.

3. The combination with a supporting standard of a trip attachment for plows, including a substantially L-shaped plow carrying member pivotally connected to one end of the standard, two links pivotally connected together, one of said links being pivotally connected to one terminal of the L-shaped member and the other link being adjustably connected to the standard, two cam shaped lugs, one lug being carried by each link, a rod pivotally connected to the lower lug and slidably mounted in the upper lug, a coil spring adjustably mounted upon said rod, and means mounted upon the rod to be acted upon by the spring to engage the upper cam lug to normally hold the lugs in yielding engagement with each other and the links straightened.

In testimony whereof I affix my signature.

JOHN T. SANDERS.

Copies of this patent may be obtained for five cents each, by addressing the "Commissioner of Patents, Washington, D. C."